(12) United States Patent
Pazzucconi et al.

(10) Patent No.: US 6,204,217 B1
(45) Date of Patent: *Mar. 20, 2001

(54) PROCESS FOR THE PREPARATION OF MICRO-MESOPOROUS GEL

(75) Inventors: Giannino Pazzucconi, Pavia; Gianluca Bassi, Milan; Roberto Millini, Riozzo-Cerro al Lambro; Carlo Perego, Carnate; Giovanni Perego, Milan; Giuseppe Bellussi, Piacenza, all of (IT)

(73) Assignee: Eni Tecnologie S.p.A., San Donato (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/172,268

(22) Filed: Oct. 14, 1998

Related U.S. Application Data

(63) Continuation of application No. 08/628,513, filed on Apr. 5, 1996, now abandoned.

(30) Foreign Application Priority Data

Apr. 7, 1995 (IT) ............................................. MI95A0712

(51) Int. Cl.⁷ .................................................... B01J 21/08
(52) U.S. Cl. .......................... 502/239; 423/326; 502/237; 502/238; 516/111
(58) Field of Search ................................. 423/326, 328.1, 423/330.1; 502/234, 235, 237, 238, 240, 242, 246, 263, 236, 239; 516/111

(56) References Cited

U.S. PATENT DOCUMENTS 5,789,336   8/1998   Pazzucconi et al. ................. 502/240

FOREIGN PATENT DOCUMENTS

| 0 492 697 A1 | 7/1992 | (EP) . |
| 0 659 478 A1 | 6/1995 | (EP) . |
| 0 691 305 A1 | 1/1996 | (EP) . |
| WO 91/11390 | 8/1991 | (WO) . |

*Primary Examiner*—Stuart Hendrickson
(74) *Attorney, Agent, or Firm*—Oblon, Spivak, McClelland, Maier & Neustadt, P.C.

(57) ABSTRACT

Process for the preparation of a micro-mesoporous gel consisting of a silica matrix in which one or more metal oxides are possibly dispersed comprising: (a) subjecting to hydrolysis and gelification a tetra-alkylorthosilicate with an alkyl-trimethylammonium hydroxide having the formula $R(CH_3)_3N$—OH, wherein R is selected from n-butyl, n-pentyl, n-hexyl and n-heptyl, possibly in the presence of one or more metal compounds, the molar ratios in this mixture being: R—$OH/SiO_2$=0–10; $R(CH_3)_3N$—$OH/SiO_2$=0.05–0.4; $H_2O/SiO_2$=5–40; metal oxides/$SiO_2$=0–0.02; whereas the ratio $H_2O/R(CH_3)_3N$—OH varies according to the number of carbon atoms in the alkylic chain R as follows: R=n-butyl, $H_2O/R(CH_3)_3N$—OH<35; R=n-pentyl, $H_2O/R(CH_3)_3N$—OH<70; R=n-hexyl, $H_2O/R(CH_3)_3N$—OH<102; R=n-heptyl, $H_2O/R(CH_3)_3N$—OH<136; (b) subjecting the gel or solid obtained in step (a) to drying and calcination.

7 Claims, 17 Drawing Sheets

PROCESS FOR THE PREPARATION OF MICRO-MESOPOROUS GEL

Figure 1:
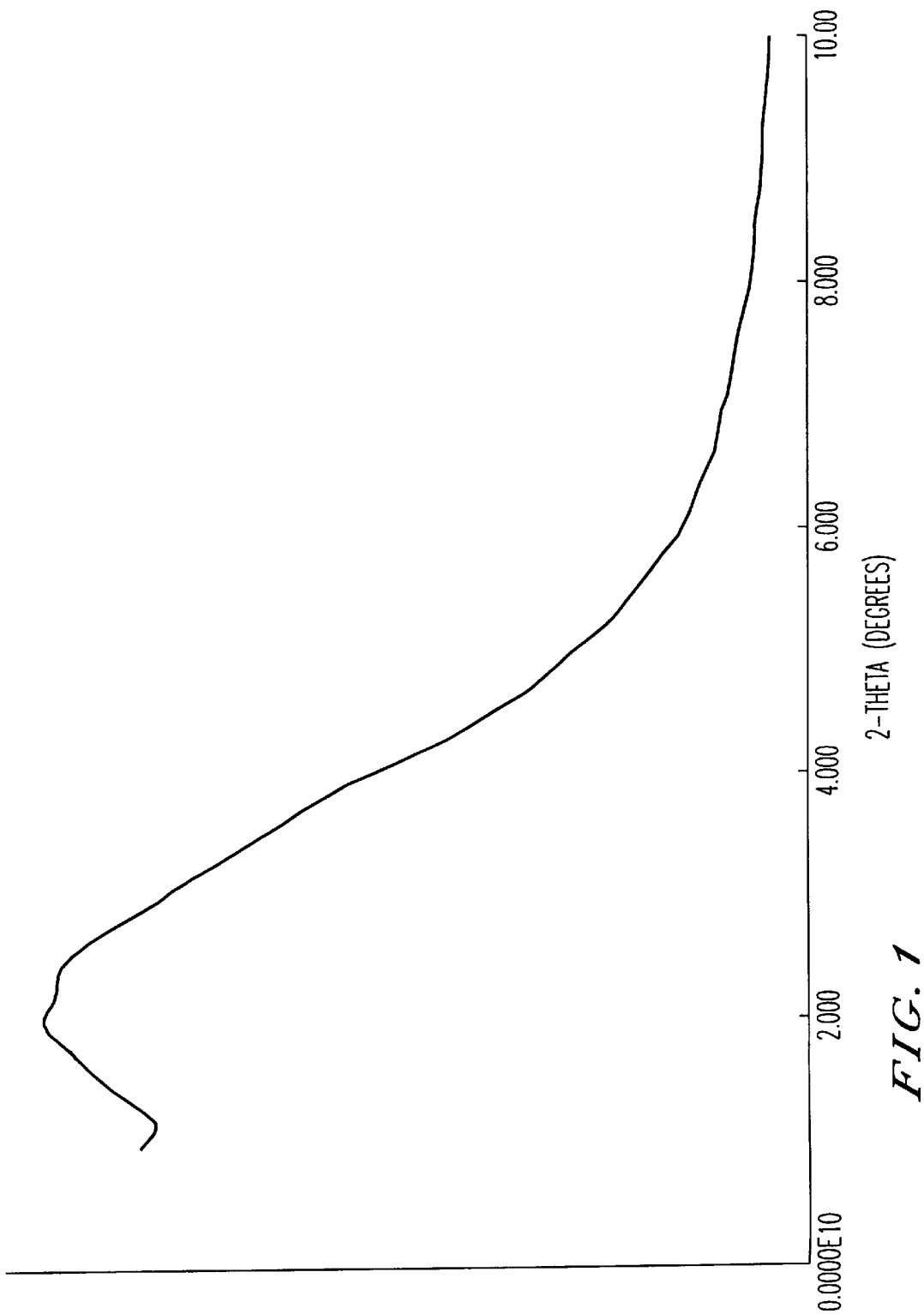

This application is a continuation of abandoned application Ser. No. 08/628,513, filed on Apr. 5, 1996.

The present invention relates to a process for the preparation of a micro-mesoporous gel, consisting of a silica matrix in which one or more metal oxides having a catalytic activity are possibly dispersed.

More specifically, the present invention relates to a process for the preparation of a micro-mesoporous gel consisting of a silica matrix in which one or more metal oxides selected from transition metals or metals belonging to groups IIIA, IVA and VA, characterized by a monomodal pore distribution, are possibly uniformly dispersed.

Among materials known in the art which can be used in various fields such as heterogeneous catalysis, the separation of liquids or gases, ion exchange, zeolites should be mentioned, which are porous crystalline alumino-silicates of a natural or synthetic nature.

The particular characteristic of zeolites is the presence of a controlled microporosity, with channels having dimensions of between about 3 Å and 7 Å. In some particular zeolitic structures, there are cavities with greater dimensions, up to about 13 Å. On the basis of the average dimensions of the channels, zeolites are classified as small, medium or large pores, the latter having an average pore diameter of about 7 Å.

The preparation of zeolites with channels having an average diameter of more than 7 Å is still of great interest in the field of heterogeneous catalysis as the use of these materials could be extended to reactions involving sterically hindered organic molecules, which are not possible with the microporous systems known at present. These materials could be used in industrial processes for the production of intermediates for the chemical industry, of fine chemicals and, above all, for the transformation of heavy refinery feeds and for the process called "Fluid Catalytic Cracking" (FCC). Attempts at synthesizing zeolites of this type have so far had no success even though an aluminium phosphate called VPI-5, with an average pore diameter of about 12.1 Å has been prepared, as described by M. E. Davis, C. Saldarriaga, C. Montes, J. Garces and C. Crowder, Nature (1988), Vol. 331, page 698 and also Cloverite, a gallium phosphate characterized by pores with a diameter of between 6 Å and 13.2 Å as described by M. Estermann, L. B. McCusker, Ch. Baerlocher, A. Merrouche and H. Kessler, Nature (1991), Vol. 352, page 320.

The practical use in acid-catalyzed reactions of the products described above is however jeopardized by the weak acid force, low thermal stability and limited resistance to hydrothermal treatment.

The possibility of synthesizing an amorphous silica-alumina with a high surface area characterized by a narrow distribution of mesoporosity (with pore dimensions within the range of 37 Å and 150 Å) has been described by M. R.Manton and J. C. Davidtz, Journal of Catalysis (1979), Vol. 60, pages 156–166. These materials however have not found practical application.

More recently, European patent 463.673 and U.S. Pat. Nos. 4,992,608 and 5,049,536 describe the possibility of obtaining amorphous alumino-silicates with a rather narrow pore distribution (average diameter of about 10 Å or less, basic absence of pores with a diameter of more than 30 Å) and excellent catalytic properties in acid-catalyzed reactions. These properties probably derive from the fact that the preparation method used allows a uniform distribution of the aluminium in tetrahedric coordination. This enables the amorphous alumino-silicates described above to be classified as zeolite-like materials.

The process for the synthesis of the above materials is similar, in fact, to that which is typically used for some zeolites and differs from this in the basic absence of hydrothermal treatment. The process involves the mixing of a silica source (preferably tetraethylorthosilicate) and an aluminium source (a trialkoxide, preferably tri-n-propoxide or tri-isopropoxide) with an aqueous solution of a tetraalkylammonium hydroxide ($R_4N$—OH, with R=ethyl, n-propyl, n-butyl). The solution obtained is subsequently gelified by heating to a temperature of between 50° C. and 70° C. In this way, a partial evaporation of the alcohols produced by the hydrolysis of the reagents, is obtained. The gel obtained is then dried and calcined to give the final product.

Even more recently, Italian patent application MI 93 A 002696 describes amorphous alumino-silicates characterized by a dimensionally very narrow distribution of the micro-mesoporosity, obtained by a process in which the gelification is carried out at the boiling point (or slightly higher) of the alcohols produced by the hydrolysis of the reagents, without eliminating the alcohols themselves from the reagent mixture. This process can be easily carried out in a reactor equipped with a reflux condenser or in a closed autoclave, operating at autogenous pressure. The ammonium bases claimed are still of the $R_4N$—OH type (with R =ethyl, n-propyl, n-butyl, n-pentyl). The positive effect of the presence of alcohol on the porous characteristics of the above amorphous alumino-silicates has also been verified by adding an alcohol, preferably ethanol, to the reaction mixture, in a quantity of up to a maximum of the molar ratio between alcohol added and $SiO_2$ of 8/1. It should be pointed out that the presence of alcohol makes the reaction mixture homogeneous right from the beginning. Under these conditions, the hydrolysis and gelification rate is much higher than under heterogeneous conditions. In addition, the gelification can also take place at temperatures lower than the boiling point of the alcohols produced by the hydrolysis of the reagents, even at room temperature, with times which are not necessarily higher than those used in the analogous process carried out at 60° C. in a heterogeneous phase.

Patent application WO 91/11390 describes the possibility of obtaining a new group of mesoporous alumino-silicates (called M41S) having an average pore diameter of between 20 Å and 100 Å and regularly organized in the material according to a hexagonal structure (MCM-41) or cubic structure (MCM-48).

These materials can be prepared starting from a mixture containing at least a silica source, an alumina source, an organic compound having formula $R_1R_2R_3R_4Q$—OH wherein Q is nitrogen or phosphorous, at least one among $R_1$, $R_2$, $R_3$ and $R_4$, represents an aryl or alkyl group containing from 6 to 36 carbon atoms, and each of the remaining $R_1$, $R_2$, $R_3$ and $R_4$ is selected from hydrogen and an alkyl group containing from 1 to 5 carbon atoms. Examples of cations having formula $R_1R_2R_3R_4Q^*$ which can be used according to WO 91/11390 are: cetyltrimethylammonium, cetyltrimethylphosphonium, octadecyltrimethylphosphonium, benzyltrimethylammonium, cetylpyridinium, myristyltrimethylammonium, decyltrimethylammonium, dodecyltrimethylammonium and dimethyldidodecylammonium.

A quaternary ammonium base can also be present, having the above formula $R_1R_2R_3R_4N$—OH wherein, however, $R_1$, $R_2$, $R_3$ and $R_4$ are selected from hydrogen and a $C_1$–$C_5$ alkyl group or, two among the alkyl groups, can be jointly considered as forming a cyclic compound.

The mixture is subjected to hydrothermal treatment at a temperature of between 25° C. and 250° C. for a time of between 5 minutes and 14 days.

The product obtained is characterized by an X-ray diffraction spectrum from powders (XRD) having a hexagonal structure with a bidimensional order or a symmetrical cubic structure. Analyses carried out with high resolution transmission electronic microscopy (HREM) show, in the case of mesoporous alumino-silicates with a hexagonal symmetry (called MCM-41), the presence of monodimensional mesoporosity regularly organized according to a honeycomb hexagonal structure. In these aluminium materials there is a tetrahedric coordination which gives acidity to the material. In addition, these materials are extremely stable to thermal treatment.

In Italian patent application MI 94 A 01399 it has been found that, by means of a process deriving from that described in Italian patent MI 93 A 002696 for the preparation of amorphous alumino-silicates and much simpler than the process described in patent application WO 91/11390 for the preparation of mesoporous alumino-silicates (called M41S), it is possible to produce micro-mesoporous metal-silicates characterized by a narrow distribution of the pore dimensions and with a partial order of these.

In fact, whereas the alumino-silicates obtained with the process described in the above Italian patent application are completely amorphous, these new materials called ERS-8, are characterized by an X-ray diffraction spectrum (XRD) from powders which has a diffuse reflection at low angles, indicating a short-range order of the mesoporous structure. The existence of a short-range structural order allows this group of materials to be identified as intermediates among analogous orderly materials (M41S) and completely disorderly materials (amorphous alumino-silicates).

The materials described in MI 94 01399 therefore consist of a micro-mesoporous gel consisting of a silica matrix in which one or more metal oxides may be uniformly dispersed, wherein the metals are selected from transition metals or metals belonging to groups IIIA, IVA and VA, characterized by a monomodal distribution of the porosity. This metal-silica gel can be conveniently used as a heterogeneous catalyst, as an absorbent or as a support for catalysts in industrial processes in the fields of refining, petrolchemistry, basic and fine chemistry.

Figure 2:
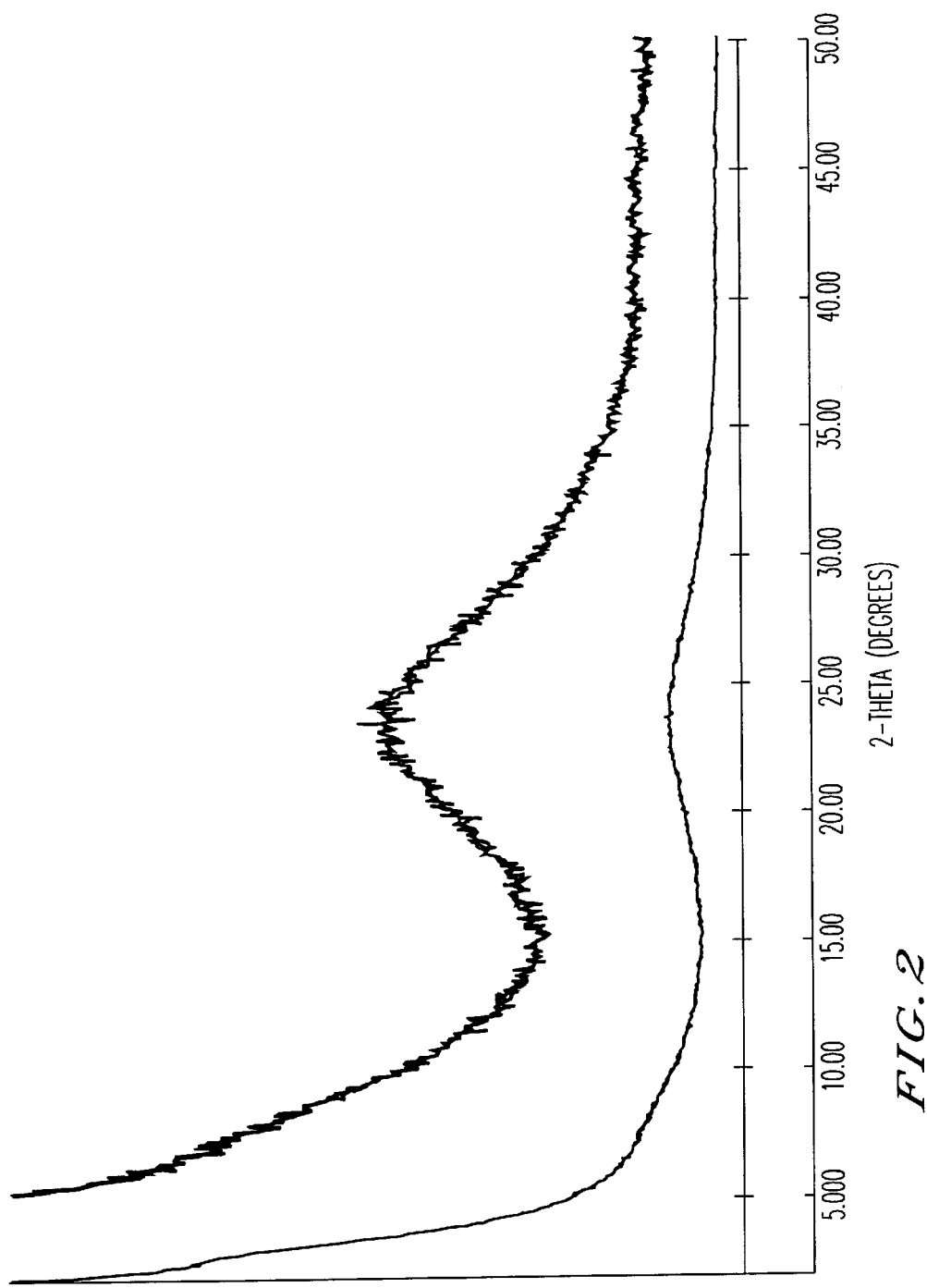

The X-ray diffraction spectrum from powders (XRD) of this micro-mesoporous metal-silica gel (called ERS-8) recorded by means of a Philips vertical diffractometer, equipped with a proportional pulse counter, divergent and receiving sleds of $\frac{1}{6}°$ and with CuKa radiation ($\lambda$=1.54178 Å), is characterized by the presence of a single enlarged diffraction line, or by a diffuse scattering, at angular values of not more than $2\theta=5°$ (FIG. 1), whereas other coherent scattering phenomena are not observed for higher angular values (FIG. 2). This can be interpreted with the presence of a short-range order of the mesoporous structure, with a limited structural correlation basically only at the first neighbours. This micro-mesoporous metal-silica gel is also characterized by a surface area of between 500 m²/g and 1200 m²/g, determined with the B.E.T. method by adsorption-desorption cycles of $N_2$ at the temperature of liquid nitrogen (77 K) using a Carlo Erba Sorptomatic 1900 instrument, and by a pore volume of between 0.3 cm³/g and 1.3 cm³/g. The pore diameter is less than 40 Å. Using the terminology suggested by IUPAC "Manual of Symbols and Terminology" (1972), Appendix 2, Part I Coll.Surface Chem. Pure Appl. Chem., Vol. 31, page 578, in which micropores are defined as pores with a diameter of less than 20 Å and mesopores as those with a diameter of between 20 Å and 500 Å, this metal-silica gel has been classified as a micro-mesoporous solid.

Figure 3:
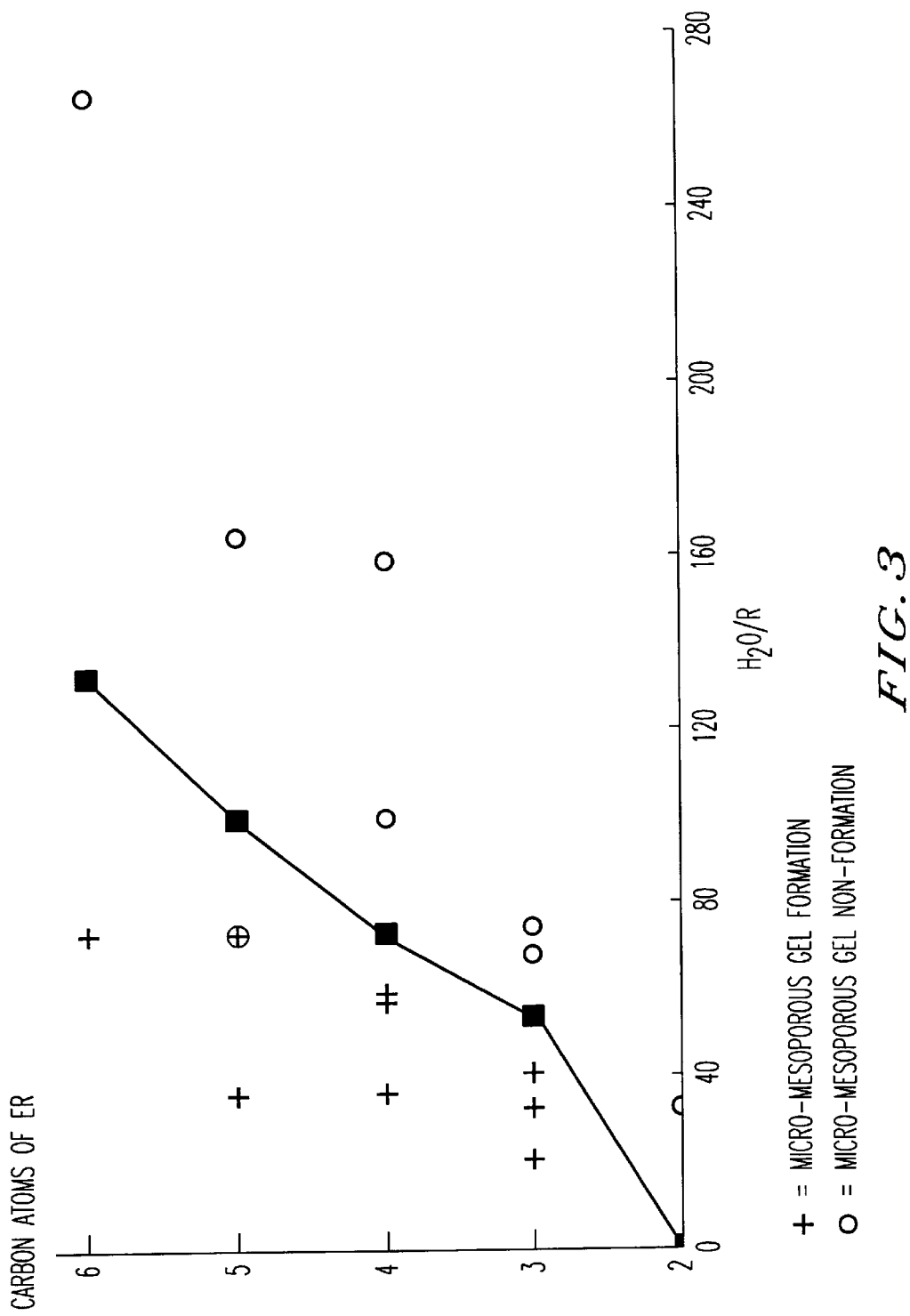

The process for the preparation of this micro-mesoporous metal-silica gel described in MI 94 10399 comprises:

(a) subjecting to hydrolysis and gelification a solution of a tetra-alkyl orthosilicate in alcohol with an aqueous solution of a hydroxide of tetra-alkylammonium having formula (I):

$$R'_4N-OH \qquad (I)$$

wherein R' represents a $C_3-C_7$ alkyl group and, possibly, of one or more soluble or hydrolyzable compounds of one or more metals whose oxides have a catalytic activity selected from transition metals or metals belonging to groups IIIA, IVA and VA;

the quantity of the constituents of the above solution being such as to respect the following molar ratios:

| $H_2O/SiO_2$ | = 5–30; |
|---|---|
| R-OH/$SiO_2$ | = 5–10; |
| $R'_4N^+/SiO_2$ | = 0.05–0.5 |
| metal oxides/$SiO_2$ | = 0–0.05; | whereas the ratio $H_2O/R'_4N^+$ varies in relation to the carbon atomic number in the R' alkyl chain according to the values shown in Table 1 below and in the graph of FIG. 3;

TABLE 1

| $R'_4$N-OH | $H_2O/R'_4N^+$ |
|---|---|
| THexylA-OH | $\leq$133 |
| TPentylA-OH | $\leq$100 |
| TButylA-OH | $\leq$73 |
| TPropylA-OH | $\leq$53 | operating at a temperature close to the boiling point, at atmospheric pressure, of the alcohol used in the solution of tetra-alkyl orthosilicate and any alcohol which is formed as by-product of the above hydrolysis reaction, without the elimination or substantial elimination of these alcohols from the reaction medium, preferably at a temperature of between 20° C. and 80° C.;

(b) subjecting the gel obtained in step (a) to drying and calcination.

The applicant has now unexpectedly found that the materials described in MI 94 01399 can be obtained using as gelifying agent, under suitable conditions, a hydroxide of alkyltrimethylammonium having formula $R(CH_3)_3N-OH$ wherein R is a linear alkyl group selected from n-butyl, n-pentyl, n-hexyl and n-heptyl.

Figure 4:
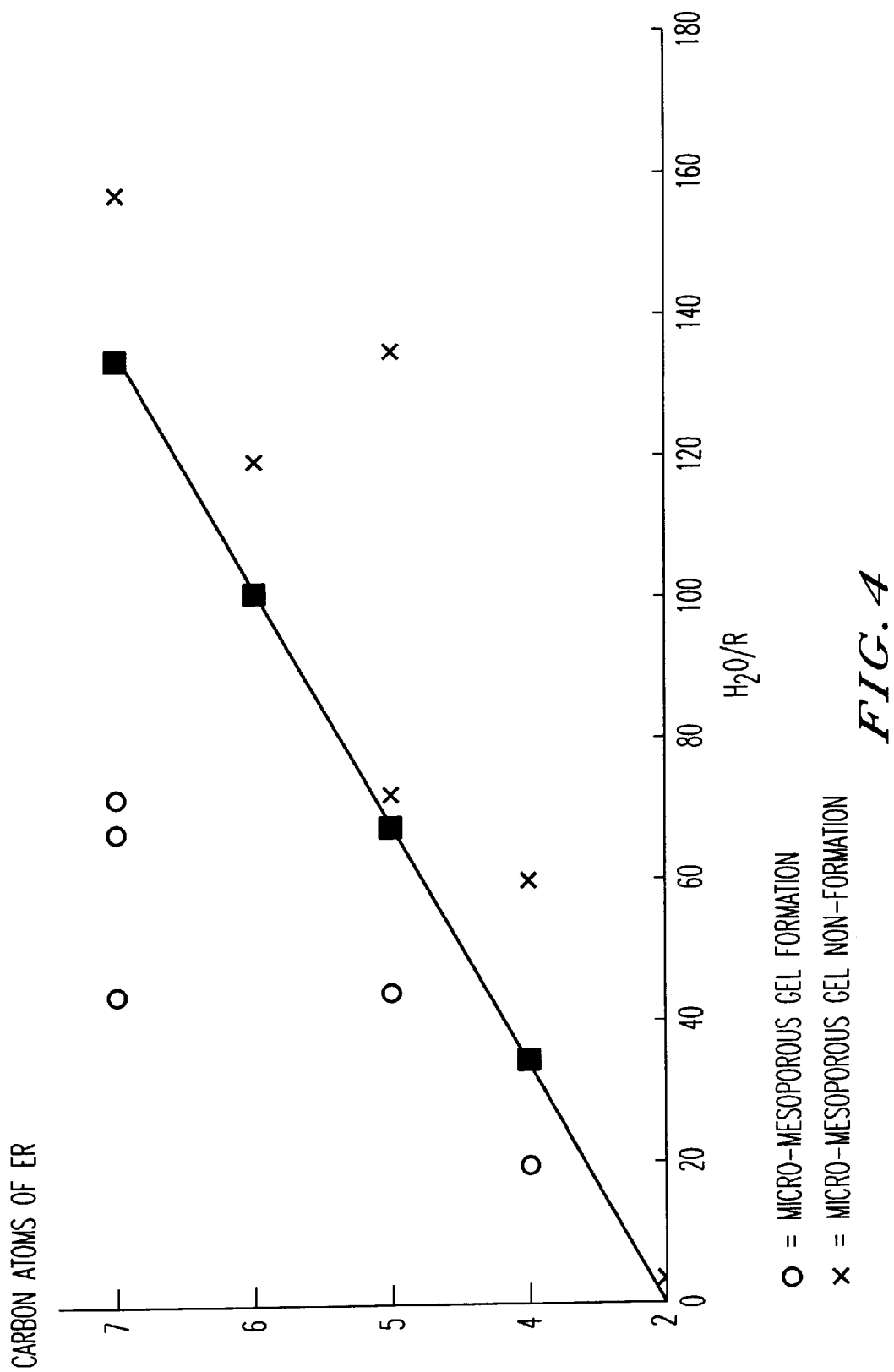

The present invention therefore relates to a process for the preparation of a micro-mesoporous gel consisting of a silica matrix in which one or more metal oxides may be uniformly dispersed, selected from transition metals or metals belonging to groups IIIA, IVA and VA, characterized by a monomodal distribution of the porosity, this process comprising:

(a) subjecting to hydrolysis and gelification a tetra-alkylorthosilicate, pure or in an alcohol solution with an aqueous solution of a hydroxide of alkyl-trimethylammonium having formula (I):

R(CH$_3$)$_3$N—OH  (I)

wherein R represents a linear alkyl group selected from n-butyl, n-pentyl, n-hexyl and n-heptyl and, possibly, of one or more soluble or hydrolyzable compounds of one or more metals whose oxides have a catalytic activity selected from transition metals or metals belonging to groups IIIA, IVA and VA;

the quantity of the constituents of the above solution being such as to respect the following molar ratios:

| | |
|---|---|
| H$_2$O/SiO$_2$ | = 5–40; |
| R-OH/SiO$_2$ | = 0–10; |
| R(CH$_3$)$_3$N—OH/SiO$_2$ | = 0.05–0.4 |
| metal oxides/SiO$_2$ | = 0–0.02; | whereas the ratio H$_2$O/R(CH$_3$)$_3$N—OH varies in relation to the number of carbon atoms in the R alkyl chain according to the values shown in Table 2 below and in the graph of FIG. 4:

TABLE 2

| R | H$_2$O/R(CH$_3$)$_3$N—OH |
|---|---|
| n-butyl | ≦35 |
| n-pentyl | ≦70 |
| n-hexyl | ≦102 |
| n-heptyl | ≦136 | operating at a temperature of between 20° C. and 80° C;

(b) subjecting the gel or solid obtained in step (a) to drying and calcination.

The tetra-alkyl orthosilicate suitable for the purposes of the present invention is selected from tetramethyl-, tetraethyl-, tetrapropyl-, tetraisopropylorthosilicate and among these tetraethylorthosilicate (TES) is preferred. The alcohol optionally used for dissolving the above tetra-alkyl orthosilicate, is preferably ethanol (EtOH).

The soluble or hydrolyzable compounds of one or more metals whose oxides have a catalytic activity which are suitable for the purposes of the present invention, are selected from the hydrosoluble or hydrolyzable salts or acids of the metals themselves. Among these aluminium tripropoxide and triisopropoxide are preferred.

In the embodiment of step (a) of the above process, an aqueous solution is first prepared, of a tetra-alkylammonium hydroxide having formula (I) and, possibly, of one or more soluble or hydrolyzable compounds of one or more metals to which, after the complete dissolution of the metal compound or compounds when present, the tetra-alkyl orthosilicate, either pure or in an alcohol solution, is subsequently added. After this addition, an increase in the viscosity of the reagent mixture is observed, the rate depending directly on the temperature and composition of the mixture itself, until the formation of a gel or precipitation of a solid. The gelification process is completed in a time of between 1 minute and 3 hours. The gel or precipitate can be subsequently subjected to aging for a time of between 1 and 72 hours, at a temperature of between 20° C. and 80° C. When there is the formation of a precipitate, this is then separated from the solvent by filtration or centrifugation.

In step (b) of the above process, the gel or solid obtained in step (a) is dried at a temperature of between 60° C. and 150° C. under vacuum and finally calcined in air at a temperature of between 450° C. and 550° C. for 6–12 hours.

Some illustrative examples are given below to provide a better understanding of the present invention and for its practical embodiment but they do not in any way limit the scope of the invention itself.

EXAMPLE 1

Gelification with n-Heptyl-trimethyl-ammonium Hydroxide 13.7 g of n-heptyl-trimethyl-ammonium hydroxide (water solution at 27.6% by weight), 43 g of water and 0.8 g of aluminium isopropoxide are heated, to about 60° C., in a laboratory beaker having a capacity of 400 cm$^3$. When the aluminium salt has completely dissolved, the beaker is removed from the heating plate and 40.9 g of tetraethylorthosilicate are added, under stirring, to the solution thus obtained.

The composition of the mixture, expressed as molar ratios, is the following:

Al$_2$O$_3$/SiO$_2$=100;
n-heptyl-trimethyl-ammonium-OH/SiO$_2$=0.11;
H$_2$O/SiO$_2$=15;
H$_2$O/n-heptyl-trimethyl-ammonium hydroxide=136.

After about 50 minutes of stirring there is the formation of a precipitate which is left to age until the following day, is filtered, dried in an oven under vacuum and then calcined in air at 500° C. for 8 hours.

Figure 5:
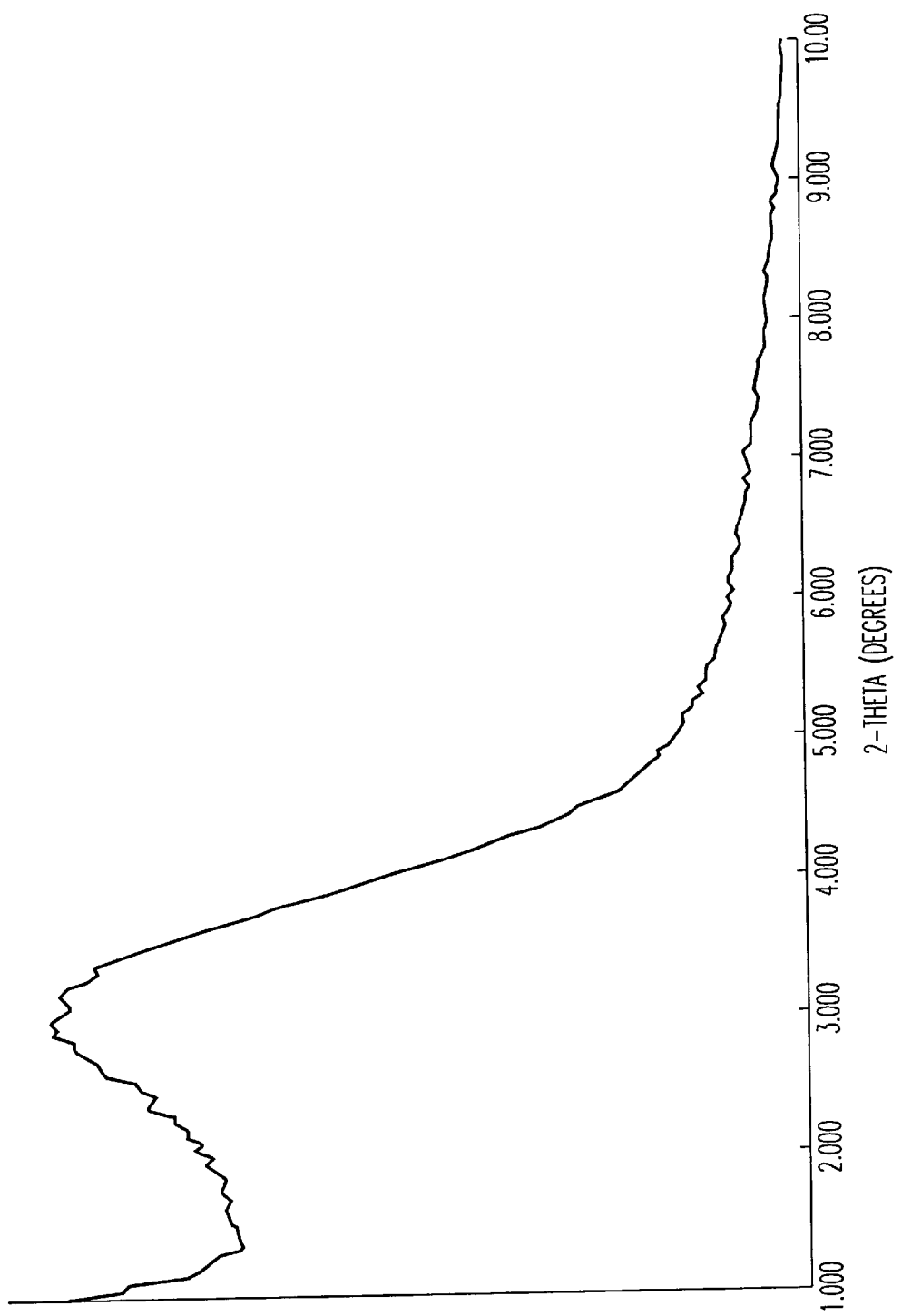

The XRD spectrum shows the presence of a reflection centred at 2θ=3.0° (d=29.5 Å) (FIG. 5). The specific surface area is equal to 655 m$^2$/g, the specific pore volume 0.394 cm$^3$/g, with a pore diameter of less than 40 Å.

EXAMPLE 2

Gelification with n-Heptyl-trimethyl-ammonium Hydroxide 17.5 g of n-heptyl-trimethyl-ammonium hydroxide (water solution at 27.6% by weight), 33 g of water and 1.02 g of aluminium isopropoxide are heated, to about 60° C., in a laboratory beaker having a capacity of 400 cm$^3$. When the aluminium salt has completely dissolved, the beaker is removed from the heating plate and 52 g of tetraethylorthosilicate and 100 g of ethanol are added, under stirring, to the solution thus obtained.

The composition of the mixture, expressed as molar ratios, is the following:
Al$_2$O$_3$/SiO$_2$=0.01;
n-heptyl-trimethyl-ammonium-OH/SiO$_2$=0.11;
H$_2$O/SiO$_2$=10;
H$_2$O/n-heptyl-trimethyl-ammonium hydroxide=73;
EtOH/SiO$_2$=8.

After about 7 minutes there is the formation of a gel which is left to age until the following day, then dried in an oven at 120° C. under vacuum and finally calcined in air at 550° C. for 8 hours.

Figure 6:
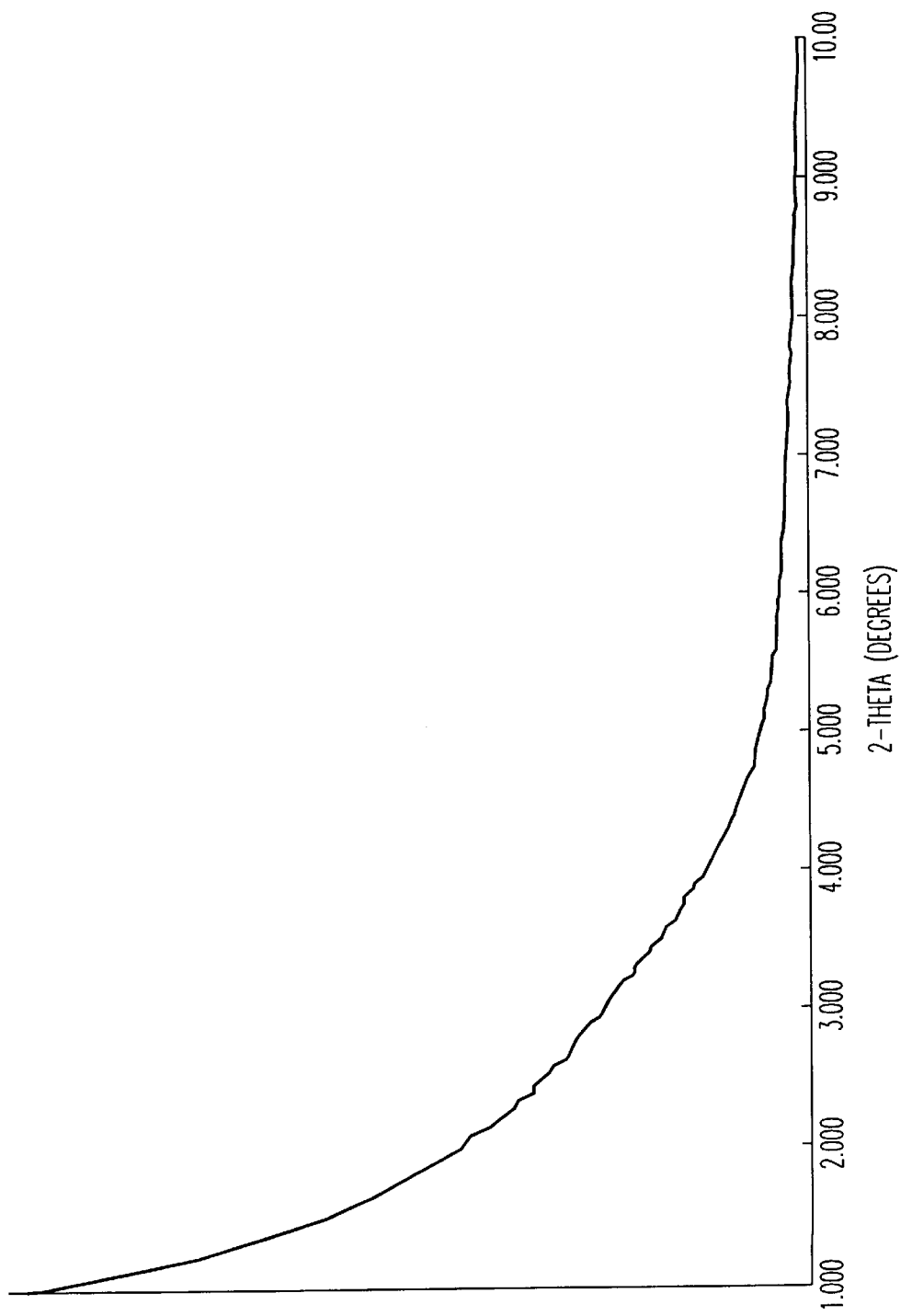

The XRD spectrum shows the presence of a weak and diffuse scattering in the range 1–4° 2θ (FIG. 6). The specific surface area is equal to 827 m$^2$/g, the specific pore volume 0.849 cm$^3$/g, with a pore diameter of less than 40 Å.

EXAMPLE 3

Gelification with n-Heptyl-trimethyl-Ammonium Hydroxide 34.9 g of n-heptyl-trimethyl-ammonium hydroxide (water solution at 27.6% by weight), 42 g of water and 1.02 g of aluminium isopropoxide are heated, to about 60° C., in a laboratory beaker having a capacity of 400 cm$^3$. When the aluminium salt has completely dissolved, the beaker is removed from the heating plate and 52 g of tetraethylorthosilicate are added, under stirring, to the solution thus obtained.

The composition of the mixture, expressed as molar ratios, is the following:
$Al_2O_3/SiO_2=0.01$;
n-heptyl-trimethyl-ammonium-OH/$SiO_2$=0.22;
$H_2O/SiO_2$=15;
$H_2O$/n-heptyl-trimethyl-ammonium hydroxide=68.

After about 2 minutes there is the formation of a gel which is left to age until the following day, then dried in an oven at 120° C. under vacuum and finally calcined in air at 550° C. for 8 hours.

Figure 7:
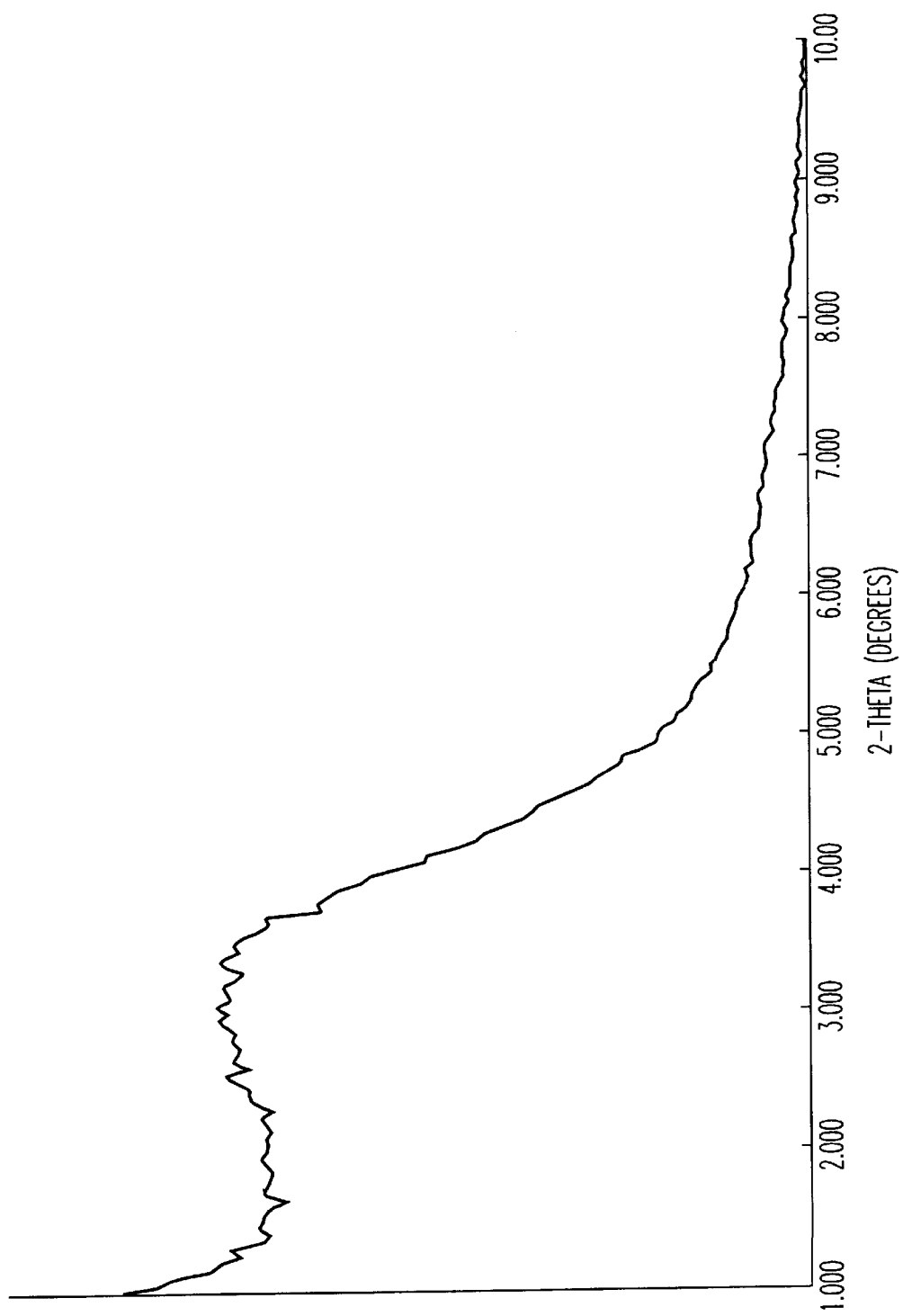

The XRD spectrum shows the presence of an enlarged reflection centred at 2θ=3.0° (d=29.5 Å) (FIG. 7). The specific surface area is equal to 1023 $m^2/g$, the specific pore volume 0.607 $cm^3/g$, with a pore diameter of less than 40 Å.

EXAMPLE 4

Gelification with n-Heptyl-trimethyl-ammonium Hydroxide 34.9 g. of n-heptyl-trimethyl-ammonium hydroxide (water solution at 27.6% by weight), 21 g of water and 1.02 g of aluminium isopropoxide are heated, to about 60° C., in a laboratory beaker having a capacity of 400 $cm^3$. When the aluminium salt has completely dissolved, the beaker is removed from the heating plate and 52 g of tetraethylorthosilicate and 100 g of ethanol are added, under stirring, to the solution thus obtained.

The composition of the mixture, expressed as molar ratios, is the following:
$Al_2O/SiO_2$=0.01;
n-heptyl-trimethyl-ammonium-OH/$SiO_2$=0.22;
$H_2O/SiO_2$=10;
$H_2O$/n-heptyl-trimethyl-ammonium hydroxide=45;
$EtOH/SiO_2$=8.

After about 3 minutes there is the formation of a gel which is left to age until the following day, then dried in an oven at 120° C. under vacuum and finally calcined in air at 550° C. for 8 hours.

Figure 8:
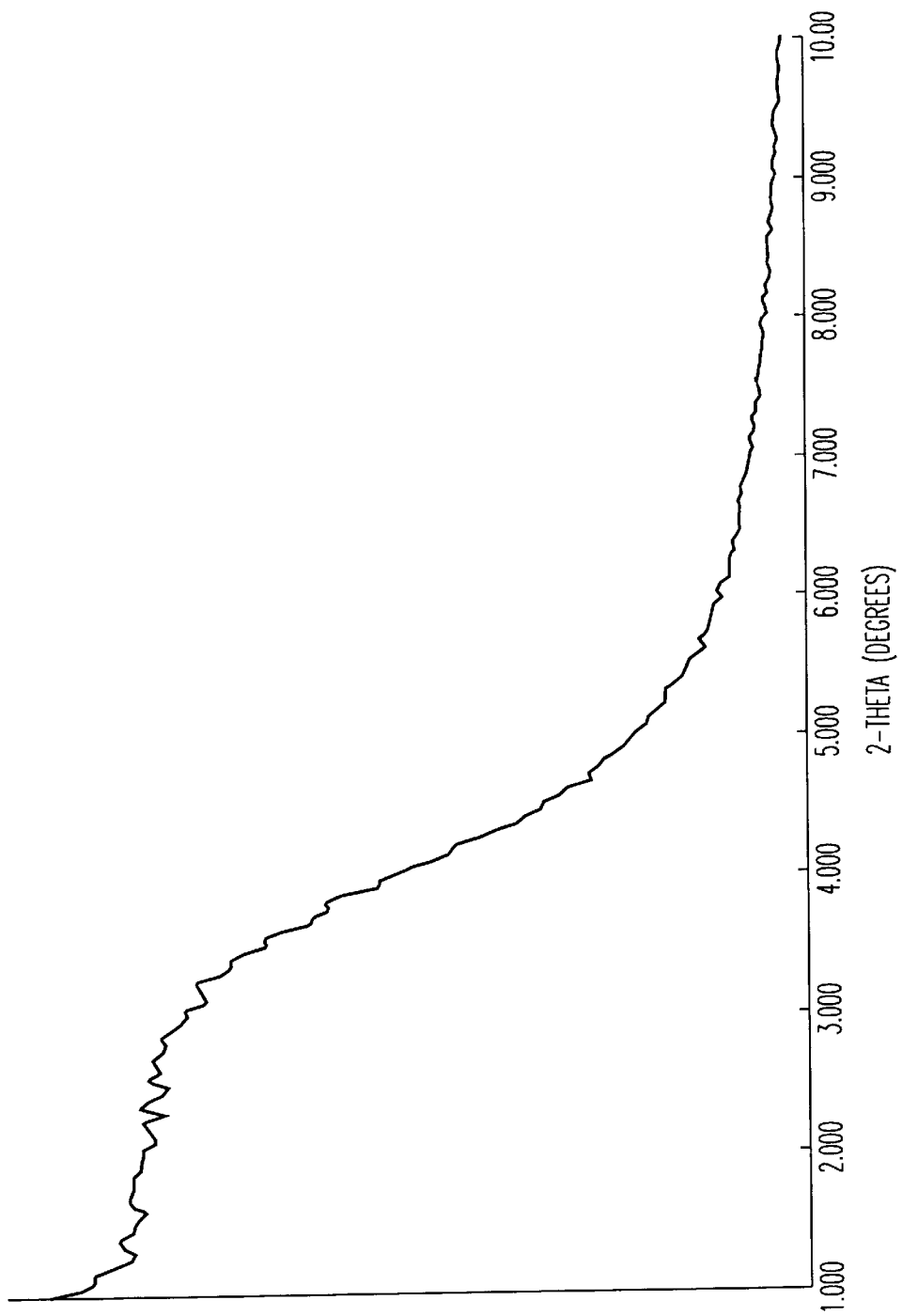

The XRD spectrum shows the presence of a diffuse scattering in the range 1–5° 2θ (FIG. 8). The specific surface area is equal to 953 $m^2/g$, the specific pore volume 0.625 $cm^3/g$, with a pore diameter of less than 30 Å.

EXAMPLE 5

Gelification with n-pentyl-trimethyl-ammonium Hydroxide 21.3 g of n-pentyl-trimethyl-ammonium hydroxide (water solution at 38.45% by weight), 54.5 g of water and 1.02 g of aluminium isopropoxide are heated, to about 60° C., in a laboratory beaker having a capacity of 400 $cm^3$. When the aluminium salt has completely dissolved, the beaker is removed from the heating plate and 52 g of tetraethylorthosilicate are added, under stirring, to the solution thus obtained.

The composition of the mixture, expressed as molar ratios, is the following:
$Al_2O/SiO_2$=0.01;
n-pentyl-trimethyl-ammonium-OH/$SiO_2$=0.22;
$H_2O/SiO_2$=15;
$H_2O$/n-pentyl-trimethyl-ammonium hydroxide=68.

After about 4 minutes there is the formation of a gel which is left to age until the following day, then dried in an oven at 120° C. under vacuum and finally calcined in air at 550° C. for 8 hours.

Figure 9:
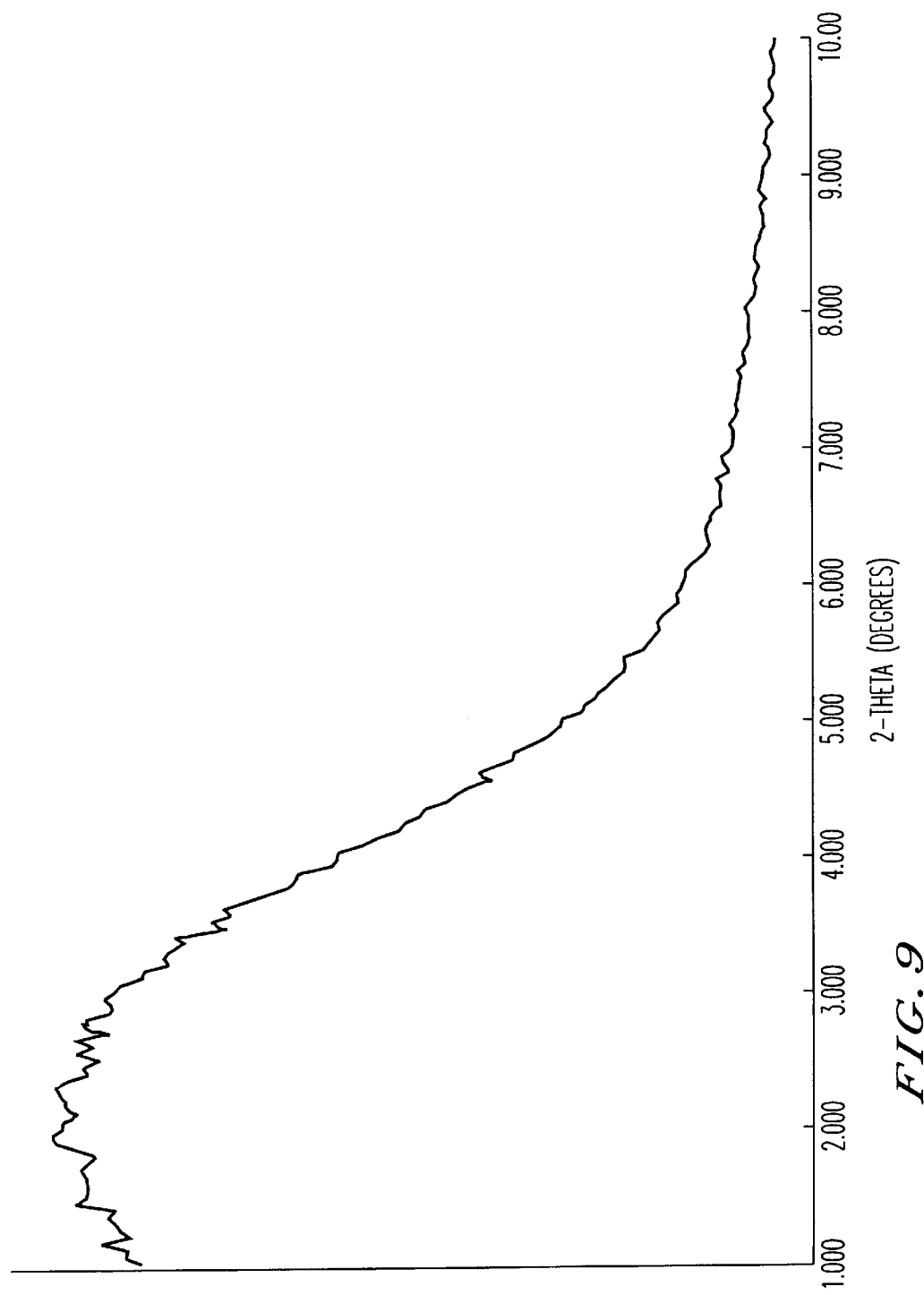

The XRD spectrum shows the presence of a weak and enlarged reflection centred at 2θ=2.2° (d=40.2 Å) (FIG. 9). The specific surface area is equal to 773 $m^2/g$, the specific pore volume 0.386 $cm^3/g$, with a pore diameter of less than 30 Å.

EXAMPLE 6

Gelification with n-pentyl-trimethylammonium Hydroxide 21.3 g of n-pentyl-trimethyl-ammonium hydroxide (water solution at 38.45% by weight), 33 g of water and 1.02 g of aluminium isopropoxide are heated, to about 60° C., in a laboratory beaker having a capacity of 400 $cm^3$. When the aluminium salt has completely dissolved, the beaker is removed from the heating plate and 52 g of tetraethylorthosilicate and 100 g of ethanol are added, under stirring, to the solution thus obtained.

The composition of the mixture, expressed as molar ratios, is the following:
$Al_2O_3/SiO_2$=0.01;
n-pentyl-trimethyl-ammonium-OH/$SiO_2$=0.22;
$H_2O/SiO_2$=10;
$H_2O$/n-pentyl-trimethyl-ammonium hydroxide=45;
$EtOH/SiO_2$=8.

After about 4 minutes there is the formation of a gel which is left to age until the following day, then dried in an oven at 120° C. under vacuum and finally calcined in air at 550° C. for 8 hours.

Figure 10:
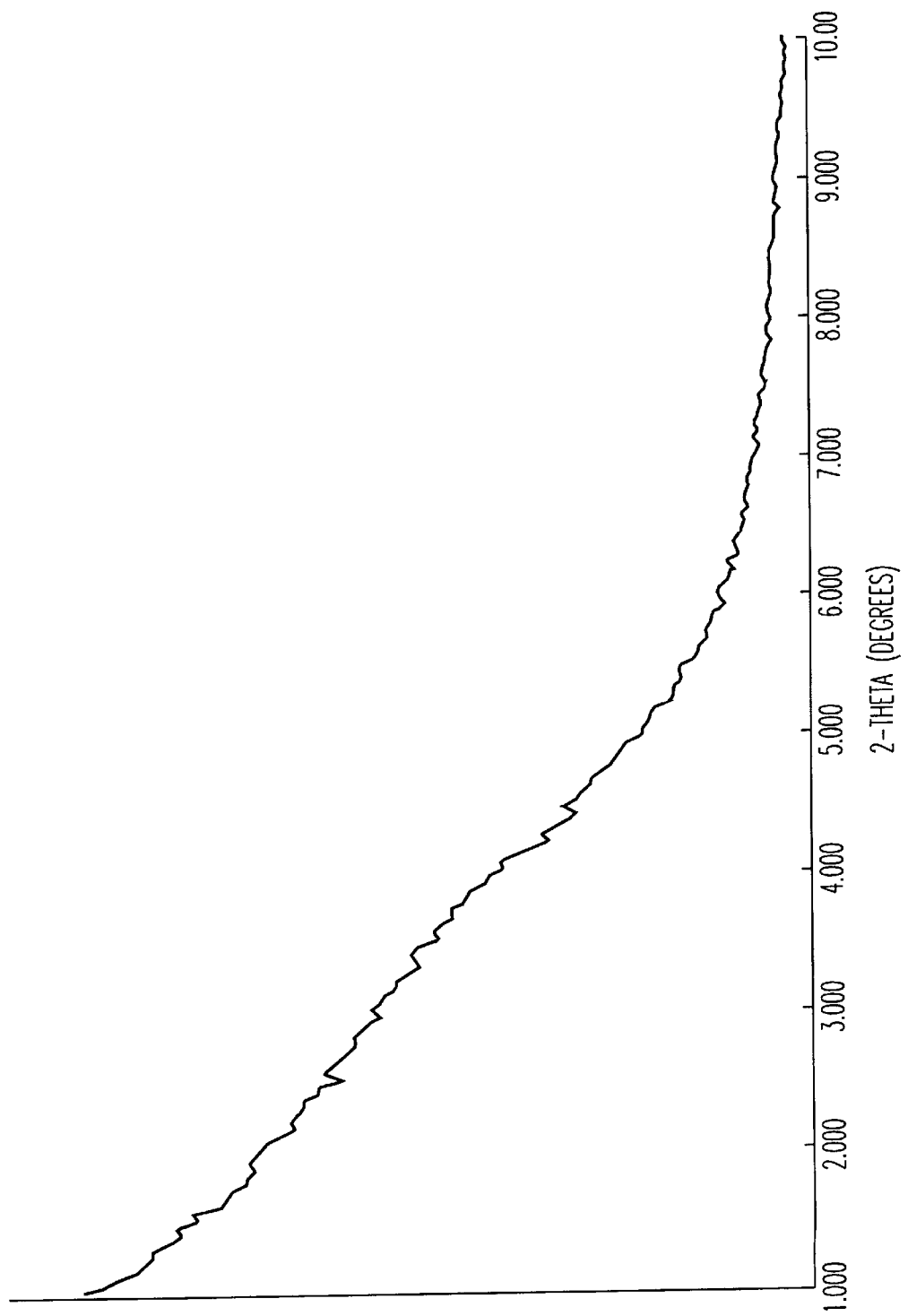

The XRD spectrum shows the presence of a diffuse scattering in the range 1–5° 2θ (FIG. 10). The specific surface area is equal to 703 $m^2/g$, the specific pore volume 0.359 $cm^3/g$, with a pore diameter of less than 40 Å.

EXAMPLE 7

Gelification with n-butyl-trimethylammonium Hydroxide.

16.9 g of n-butyl-trimethyl-ammonium hydroxide (water solution at 30% by weight), 12,1 g of water and 0.67 g of aluminium isopropoxide are heated, to about 60° C., in a laboratory beaker having a capacity of 200 $cm^3$. When the aluminium salt has completely dissolved, the beaker is removed from the heating plate and 34.6 g of tetraethylorthosilicate and 62 g of ethanol are added, under stirring, to the solution thus obtained.

The composition of the mixture, expressed as molar ratios, is the following:
$Al_2O_3/SiO_2$=0.01;
n-butyl-trimethyl-ammonium-OH/$SiO_2$=0.23;
$H_2O/SiO_2$=8;
$H_2O$/n-butil-trimethyl-ammonium hydroxide=35;
$EtOH/SiO_2$=8.

After about 2 minutes there is the formation of a gel which is left to age until the following day, then dried in an oven at 120° C. under vacuum and finally calcined in air at 550° C. for 8 hours.

Figure 11:
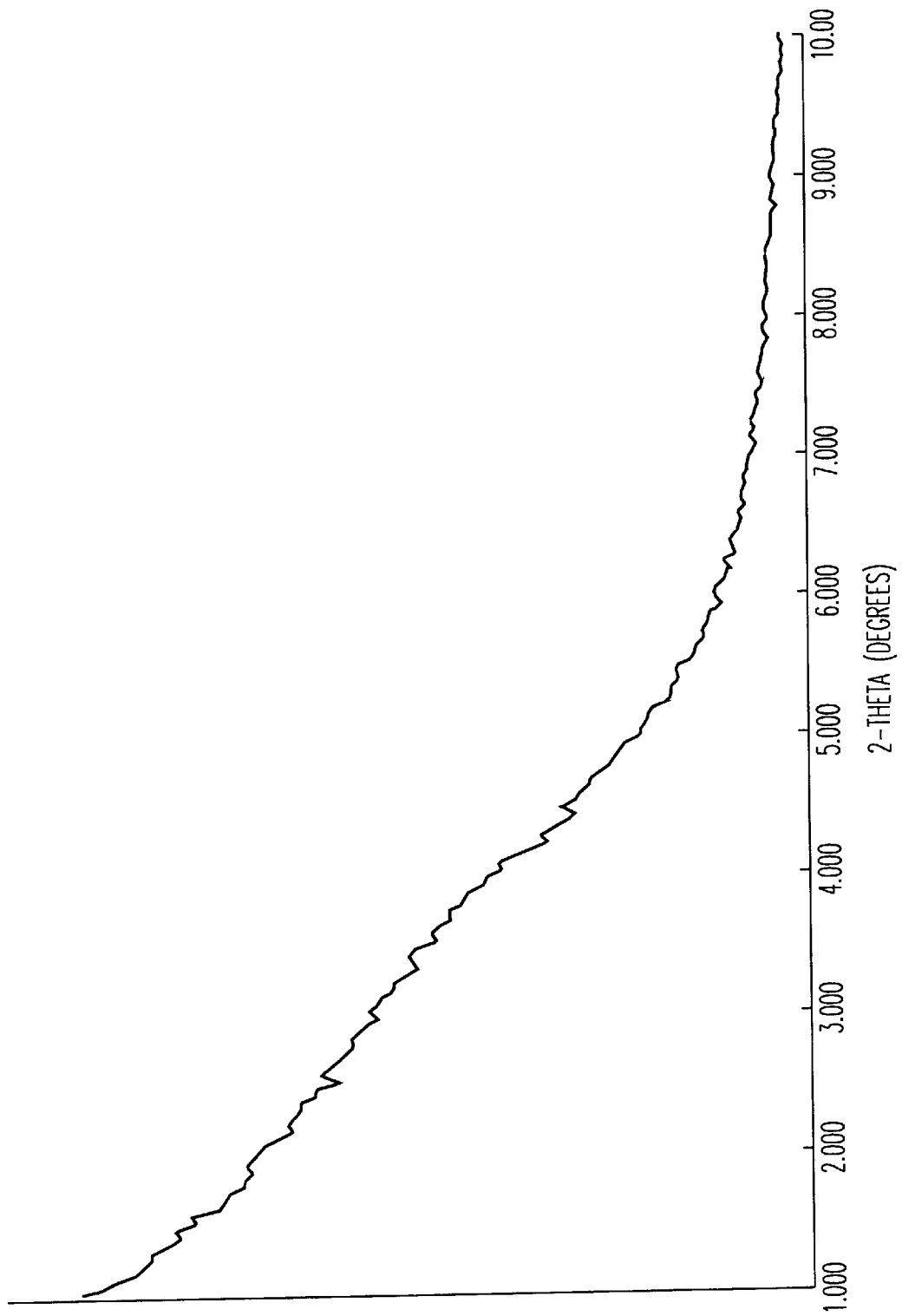

The XRD spectrum shows the presence of a weak and diffuse scattering in the range 2–5° 2θ (FIG. 11). The specific surface area is equal to 605 $m^2/g$, the specific pore volume 0.345 $cm^3/g$, with a pore diameter of less than 40 Å.

EXAMPLE 8

Gelification with n-butyl-trimethylammonium Hydroxide 29.5 g of n-butyl-trimethyl-ammonium hydroxide (water solution at 30% by weight), 3.3 g of water and 0.67 g of aluminium isopropoxide are heated, to about 60° C., in a laboratory beaker having a capacity of 200 $cm^3$. When the aluminium salt has completely dissolved, the beaker is removed from the heating plate and 34.6 g of tetraethylorthosilicate and 62 g of ethanol are added, under stirring, to the solution thus obtained.

The composition of the mixture, expressed as molar ratios, is the following:
$Al_2O_3/SiO_2$=0.01;
n-butyl-trimethyl-ammonium-OH/$SiO_2$=0.4;
$H_2O/SiO_2$=8;
$H_2O$/n-butil-trimethyl-ammonium hydroxide=20;

EtOH/SiO$_2$=8.

The product formed has the appearance of a not very viscous liquid; it is left to age until the following day, then dried in a rotating drier and finally calcined in air at 550° C. for 8 hours.

Figure 12:
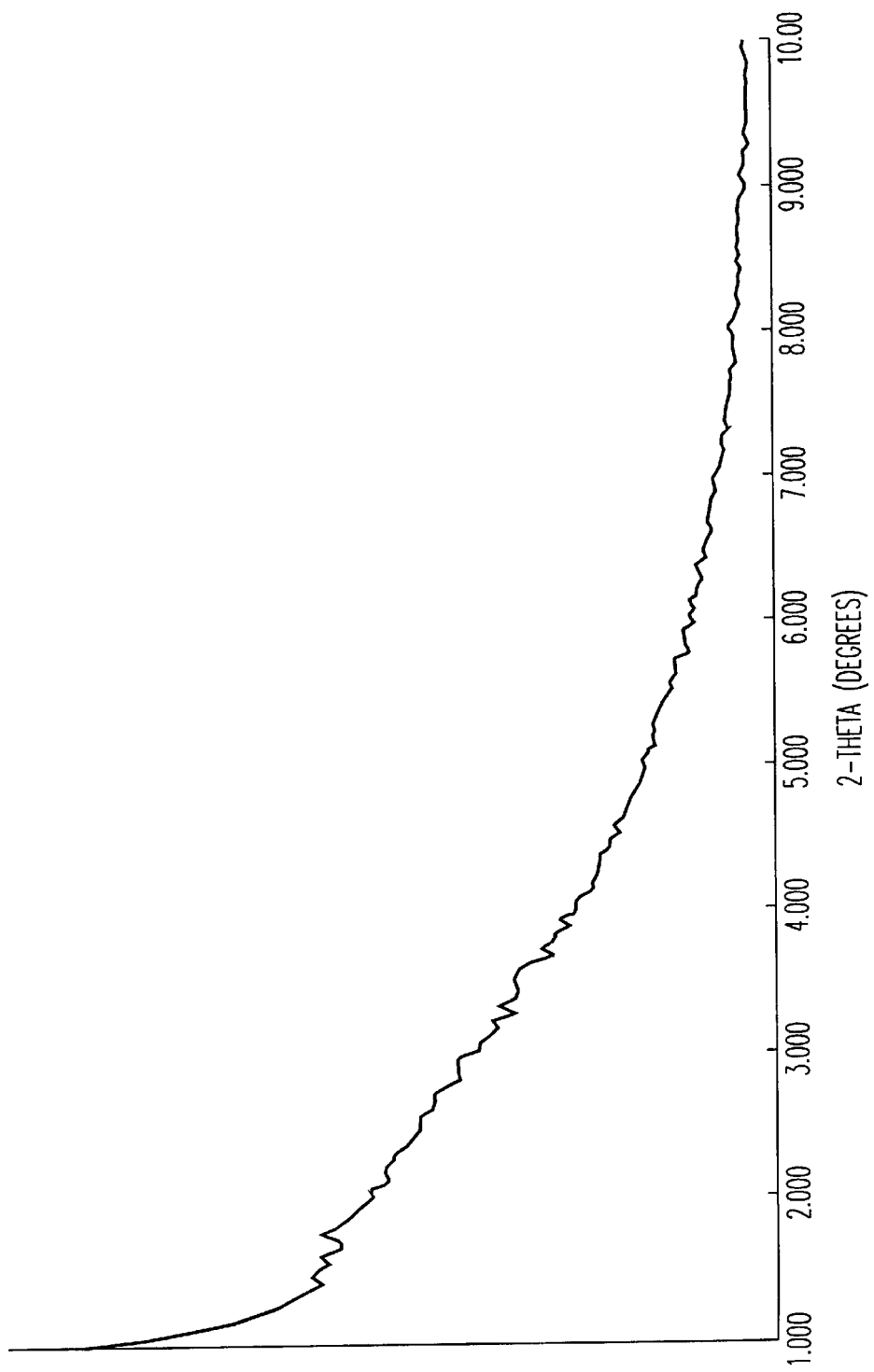

The XRD spectrum shows the presence of a weak and diffuse scattering in the range 1–5° 2θ (FIG. 12). The specific surface area is equal to 494 m$^2$/g, the specific pore volume 0.337 cm$^3$/g, with a pore diameter of less than 30 Å.

EXAMPLE 9

Comparative

Gelification with n-heptyl-trimethylammonium Hydroxide 10.8 g of n-heptyl-trimethyl-ammonium hydroxide (water solution at 20.2% by weight), 27.4 g of water and 1.04 g of aluminium isopropoxide are heated, to about 60° C., in a laboratory beaker having a capacity of 200 cm$^3$. When the aluminium salt has completely dissolved, the beaker is removed from the heating plate and 52 g of tetraethylorthosilicate and 92 g of ethanol are added, under stirring, to the solution thus obtained.

The composition of the mixture, expressed as molar ratios, is the following:
Al$_2$O$_3$/SiO$_2$=0.01;
n-heptyl-trimethyl-ammonium-OH/SiO$_2$=0.05;
H$_2$O/SiO$_2$=8;
H$_2$O/n-heptyl-trimethyl-ammonium hydroxide=160;
EtOH/SiO$_2$=8.

After about 15 minutes there is the formation of an opaque gel which is left to age until the following day, then dried in a rotating drier and finally calcined in air at 550° C. for 8 hours.

Figure 13:
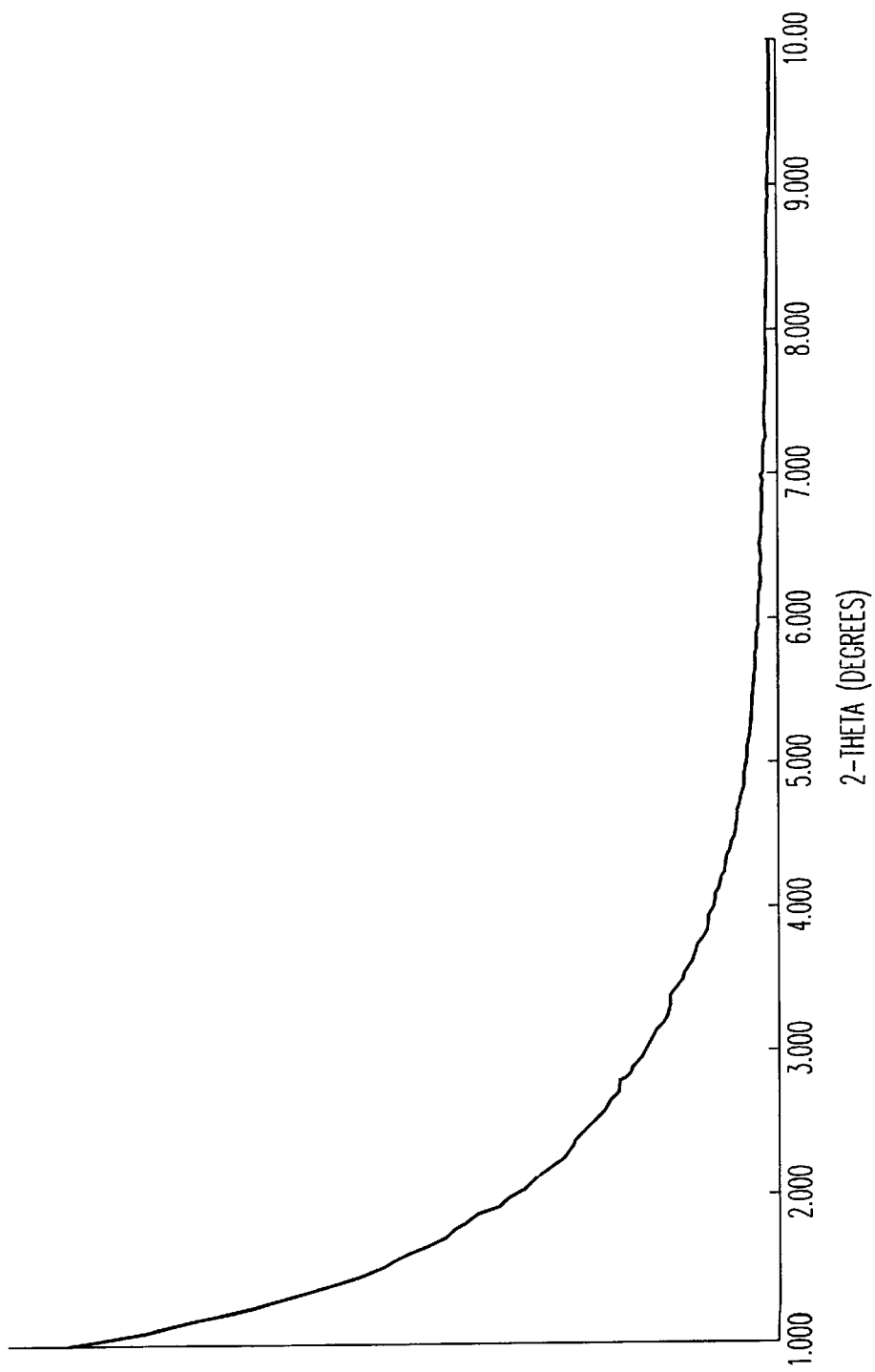

The XRD spectrum does not show the presence of any significant scattering phenomema at low angles (FIG. 13), whereas B.E.T. analysis shows a specific surface area of 775 m$^2$/g and a specific pore volume of 1183 cm$^3$/g. The distribution of the porosity is quite enlarged in the region of the mesopores, with a diameter of less than 100 Å.

EXAMPLE 10

Comparative

Gelification with n-hexyl-trimethylammonium Hydroxide 31.8 g of n-hexyl-trimethyl-ammonium hydroxide (water solution at 39% by weight), 31.8 g of water and 1.04 g of aluminium isopropoxide are heated, to about 60° C., in a laboratory beaker having a capacity of 400 cm$^3$. When the aluminium salt has completely dissolved, the beaker is removed from the heating plate and 52 g of tetraethylorthosilicate and 92 g of ethanol are added, under stirring, to the solution thus obtained.

The composition of the mixture, expressed as molar ratios, is the following:
Al$_2$O$_3$/SiO$_2$=0.01;
n-hexyl-trimethyl-ammonium-OH/SiO$_2$=0.066;
H$_2$O/SiO$_2$=8;
H$_2$O/n-hexyl-trimethyl-ammonium hydroxide=120;
EtOH/SiO$_2$=8.

After about 5 minutes there is the formation of a white gel which is left to age until the following day, dried in an oven under vacuum and then calcined in air at 550° C. for about 8 hours.

Figure 14:
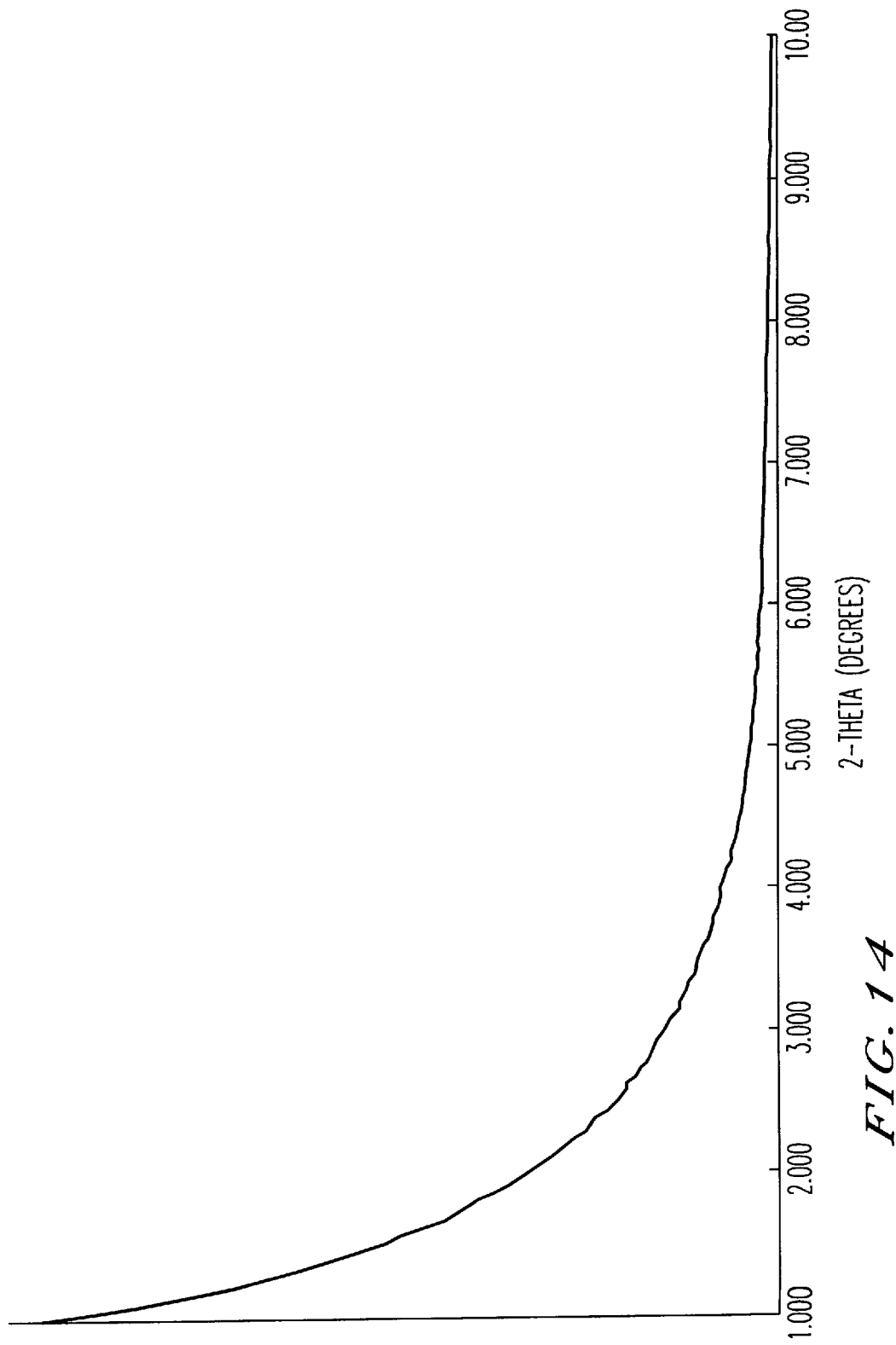

The XRD spectrum does not show the presence of any significant scattering phenomema at low angles (FIG. 14), whereas B.E.T. analysis shows a specific surface area of 766 m$^2$/g and a specific pore volume of 0.996 cm$^3$/g. The distribution of the porosity is quite enlarged in the region of the mesopores, with a diameter of less than 100 Å.

EXAMPLE 11

Comparative

Gelification with n-pentyl-trimethylammonium Hydroxide 10.6 g of n-pentyl-trimethyl-ammonium hydroxide (water solution at 38.45% by weight), 60.9 g of water and 1.02 g of aluminium isopropoxide are heated, to about 60° C., in a laboratory beaker having a capacity of 400 cm$^3$. When the aluminium salt has completely dissolved, the beaker is removed from the heating plate and 52 g of tetraethylorthosilicate are added, under stirring, to the solution thus obtained.

The composition of the mixture, expressed as molar ratios, is the following:
Al$_2$O$_3$/SiO$_2$=0.01;
n-pentyl-trimethyl-ammonium-OH/SiO$_2$=0.11;
H$_2$O/SiO$_2$=15;
H$_2$O/n-pentyl-trimethyl-ammonium hydroxide=136.

After about 25 minutes there is the formation of a gel which is left to age until the following day, dried in an oven under vacuum and then calcined in air at 550° C. for about 8 hours.

Figure 15:
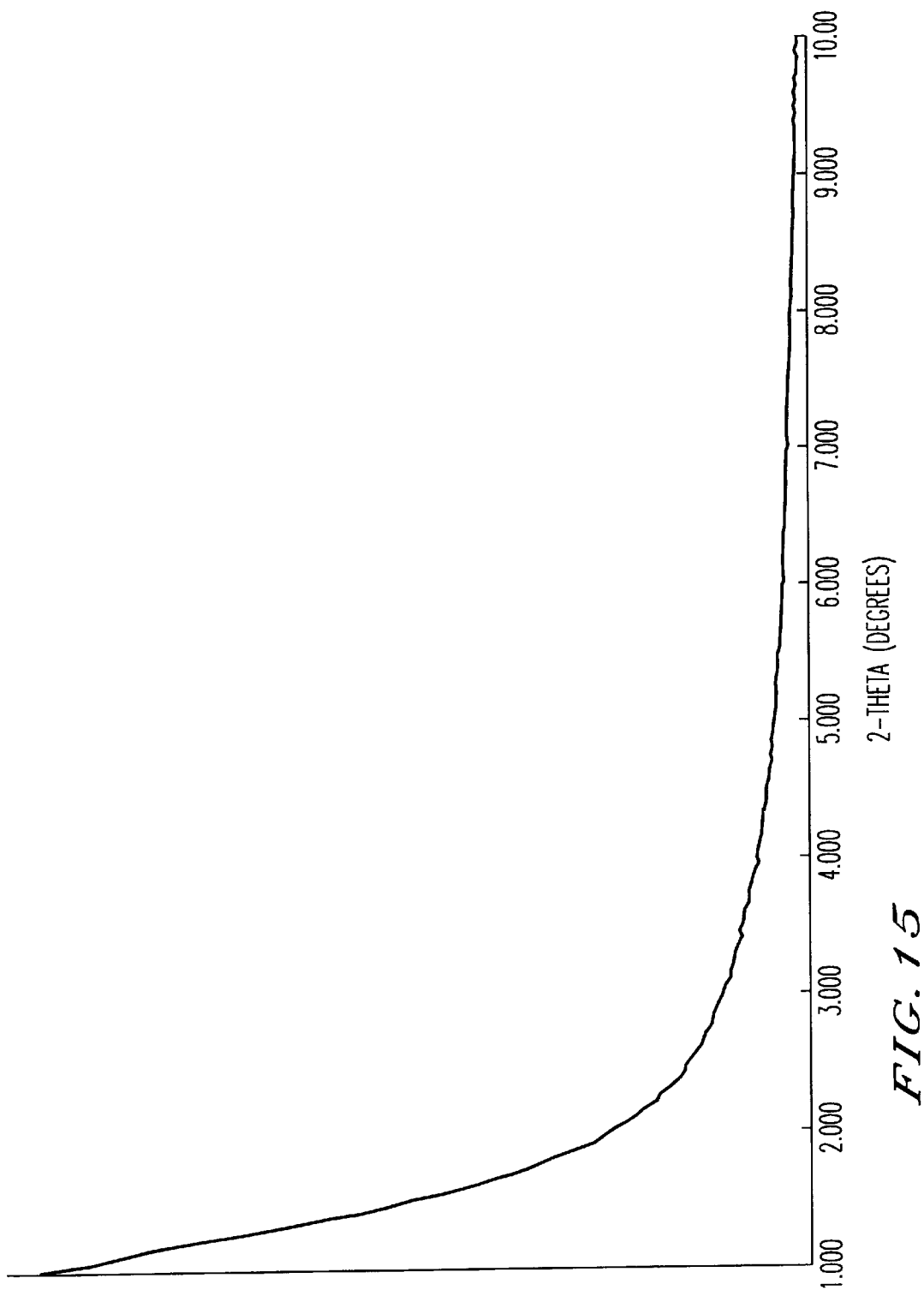

The XRD spectrum does not show the presence of any significant scattering phenomema at low angles (FIG. 15), whereas B.E.T. analysis shows a specific surface area of 659 m$^2$/g and a specific pore volume of 0.583 cm$^3$/g. The distribution of the porosity is quite narrow, centred at about 40 Å.

EXAMPLE 12

Comparative

Gelification with n-butyl-trimethylammonium Hydroxide 9.6 g of n-butyl-trimethyl-ammonium hydroxide (water solution at 30% by weight), 17.3 g of water and 0.67 g of aluminium isopropoxide are heated, to about 60° C., in a laboratory beaker having a capacity of 200 cm$^3$. When the aluminium salt has completely dissolved, the beaker is removed from the heating plate and 34.6 g of tetraethylorthosilicate and 62 g of ethanol are added, under stirring, to the solution thus obtained.

The composition of the mixture, expressed as molar ratios, is the following:
Al$_2$O$_3$/SiO$_2$=0.01;
n-butyl-trimethyl-ammonium-OH/SiO$_2$=0.13;
H$_2$O/SiO$_2$=8;
H$_2$O/n-butyl-trimethyl-ammonium hydroxide=60;
EtOH/SiO$_2$=8.

After about 4 minutes there is the formation of a turbid gel which is left to age until the following day, dried in an oven under vacuum and then calcined in air at 550° C. for about 8 hours.

Figure 16:
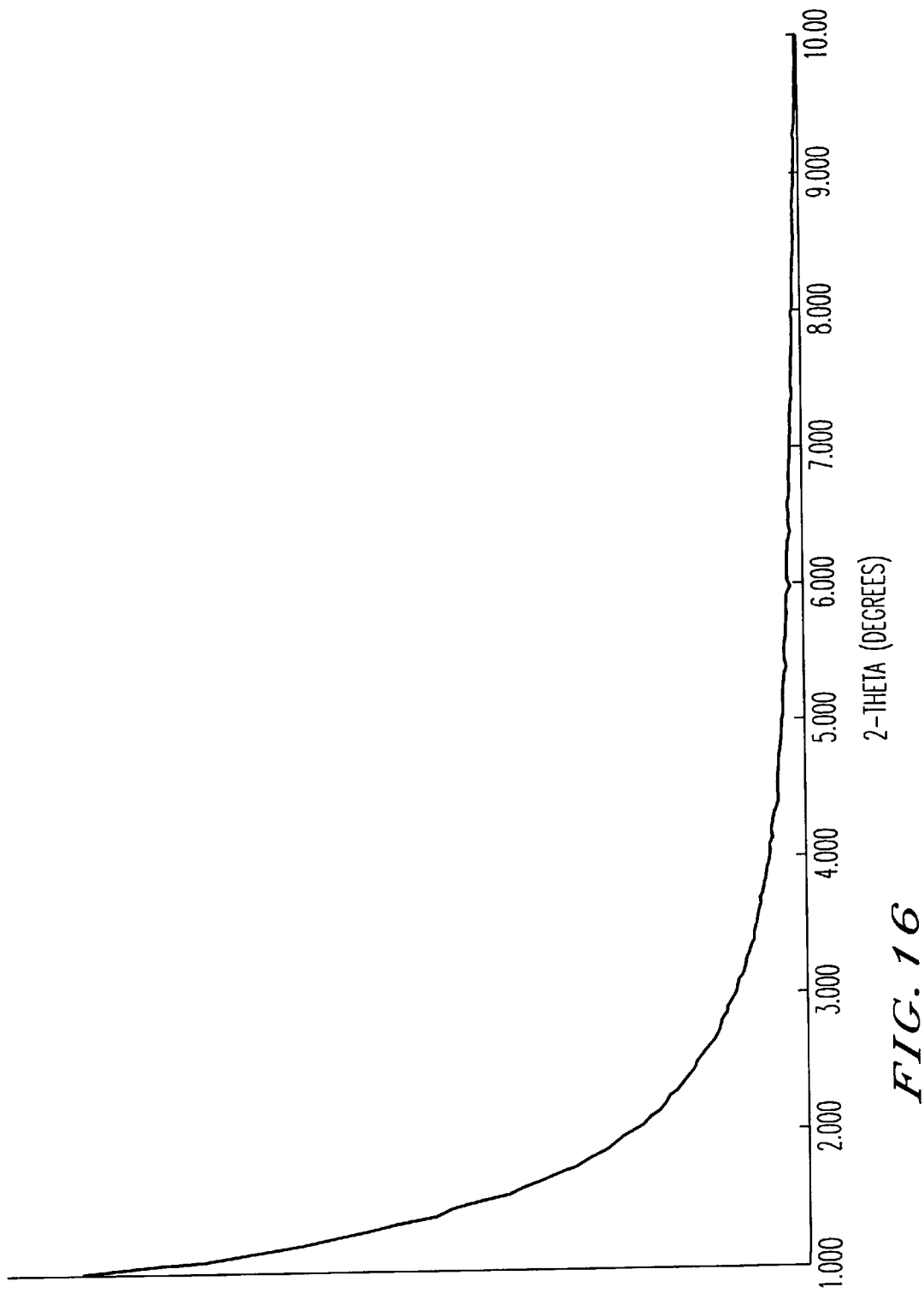

The XRD spectrum does not show the presence of any significant scattering phenomema at low angles (FIG. 16), whereas B.E.T. analysis shows a specific surface area of 695 m$^2$/g and a specific pore volume of 1.072 cm$^3$/g. The distribution of the porosity is quite enlarged in the region of the mesopores, with a diameter of less than 150 Å.

EXAMPLE 13

Comparative

Gelification with n-propyl-trimethylammonium Hydroxide 45.3 g of n-propyl-trimethyl-ammonium hydroxide (water solution at 21% by weight) and 0.2 g of aluminium isopropoxide are heated, to about 60° C., in a laboratory beaker having a capacity of 200 cm$^3$. When the aluminium salt has completely dissolved, the beaker is removed from the heating plate and 34.6 g of tetraethylorthosilicate and 62 g of ethanol are added, under stirring, to the solution thus obtained.

The composition of the mixture, expressed as molar ratios, is the following:

$Al_2O_3/SiO_2$=0.01;
n-propyl-trimethyl-ammonium-OH/$SiO_2$=1.6;
$H_2O/SiO_2$=39.7;
$H_2O$/n-propyl-trimethyl-ammonium hydroxide=5;
$EtOH/SiO_2$=8.

After about 4 minutes there is the formation of a turbid gel which is left to age until the following day, dried in an oven under vacuum and then calcined in air at 550° C. for about 8 hours.

Figure 17:
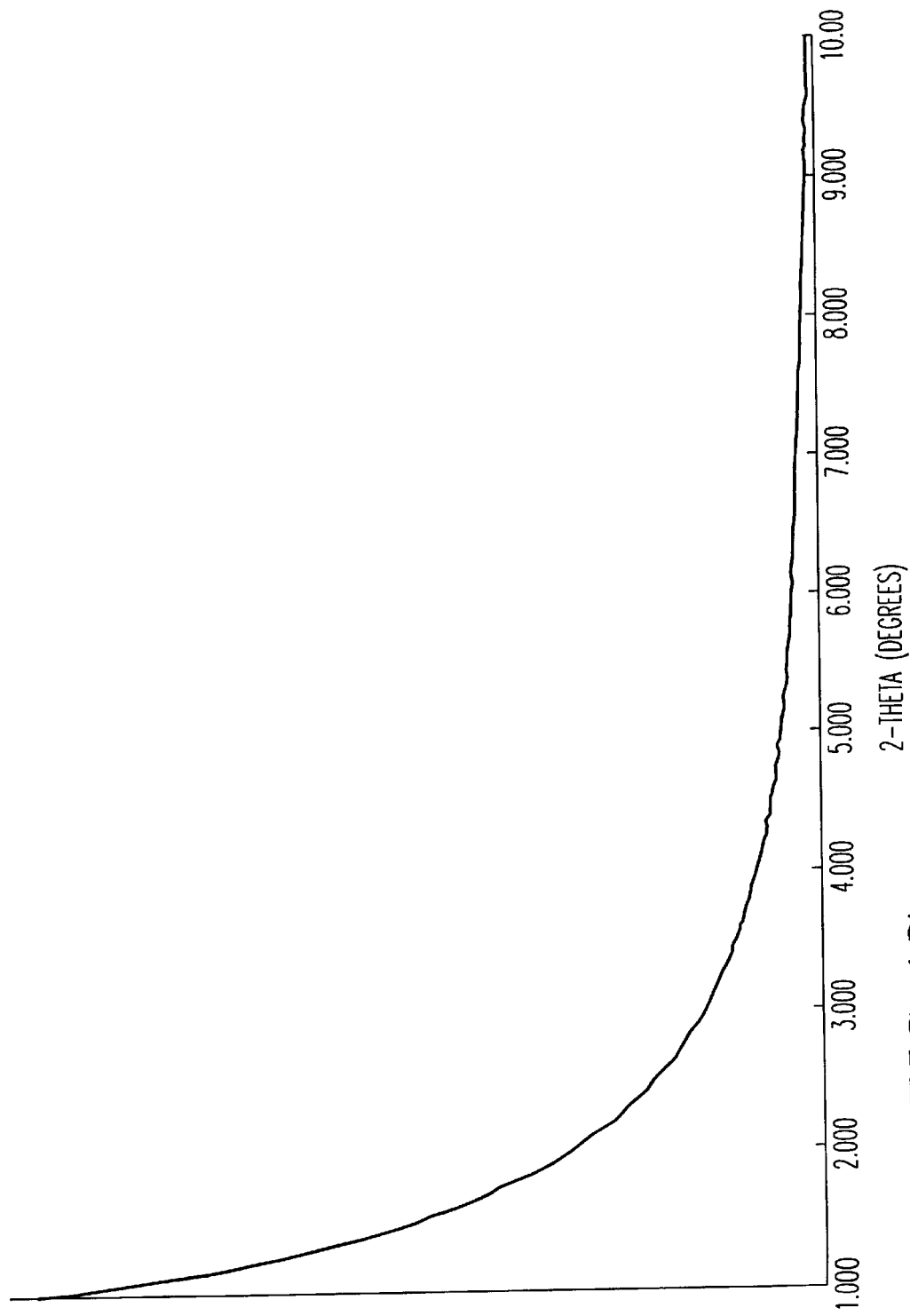

The XRD spectrum does not show the presence of any significant scattering phenomema at low angles (FIG. 17), whereas B.E.T. analysis shows a specific surface area of 308 $m^2/g$ and a specific pore volume of 0.337 $cm^3/g$. The distribution of the porosity is rather narrow in the region of the mesopores, the pores prevalently having a diameter equal to about 50 Å.

What is claimed is:

1. A process for the preparation of a micro-mesoporous gel consisting of a silica matrix in which optionally one or more oxides of metals selected from the group consisting of transition metals and metals belonging to Groups IIA, IVA and VA, is uniformly dispersed, said gel exhibiting a monomodal distribution of porosity and the presence of a single broad diffraction line, or a widespread scattering at angular values not greater than 2θ=5°, with CuKα radiation and with the absence of other scattering phenomena coherent for greater angular values, consisting essentially of:

(a) subjecting to hydrolysis and gelification a tetraalkylorthosilicate, optionally in an alcohol solution, with an aqueous solution of a hydroxide of alkyltrimethylammonium having formula (I):

$R(CH_3)_3N$—OH  (I)

wherein R represents a linear alkyl group selected from n-butyl, n-pentyl, n-hexyl and n-heptyl and, optionally one or more soluble or hydrolyzable compounds of one or more metals selected from the group consisting of transition metals and metals belonging to Groups IIIA, IVA and VA;

the quantity of the constituents of the above solution meeting the molar ratios:

$H_2O/SiO_2$=5–40;
R—$OH/SiO_2$=0–10
$R(CH_3)_3N$—$OH/SiO_2$=0.05–0.4
metal oxides/$SiO_2$=0–0.02 whereas the ratio $H_2O/R(CH_3)_3N$—OH varies in relation to the number of carbon atoms in the R alkyl chain according to the values shown in Table 2 below:

TABLE 2

| R | $H_2O/R(CH_3)_3N$—OH |
|---|---|
| n-butyl | ≦35 |
| n-pentyl | <70 |
| n-hexyl | <102 |
| n-heptyl | ≦136 | at a temperature of between 20° C. and 80° C.; and (b) subjecting the gel or solid obtained in step (a) to drying and calcination.

2. The process according to claim 1, wherein the tetra-alkyl orthosilicate is selected from tetramethyl-, tetraethyl-, tetrapropyl-, tetraisopropylorthosilicate.

3. The process according to claim 2, wherein the tetra-alkyl orthosilicate is tetraethylorthosilicate.

4. Process according to claim 1, wherein the alcohol used for dissolving the tetra-alkyl orthosilicate is ethanol.

5. The process according to claim 1, wherein the soluble or hydrolyzable compounds of one or more metals are selected from the group consisting of hydrosoluble or hydrolyzable salts of the metals.

6. The process according to claim 5, wherein the soluble or hydrolyzable compounds of one or more metals are selected from aluminum tripropoxide and aluminum triisopropoxide.

7. The process according to claim 6 wherein, in step (b), the gel or solid obtained in step (a) is dried to a temperature of between 60° C. and 150° C. under vacuum and calcined in air at a temperature of between 450° C. and 550° C. for 6–12 hours.

* * * * *